United States Patent
Buza et al.

(10) Patent No.: US 9,183,011 B2
(45) Date of Patent: Nov. 10, 2015

(54) METHOD AND SYSTEM FOR RUNTIME ENVIRONMENT EMULATION

(75) Inventors: Kyle Matthew Buza, S. Salem, OR (US); Robert James Rocchetti, Los Altos Hills, CA (US)

(73) Assignee: Oracle America Inc., Redwood Shores, CA (US)

( * ) Notice: Subject to any disclaimer, the term of this patent is extended or adjusted under 35 U.S.C. 154(b) by 2871 days.

(21) Appl. No.: 11/591,141

(22) Filed: Oct. 31, 2006

(65) Prior Publication Data

US 2008/0127156 A1 May 29, 2008

(51) Int. Cl.
G06F 9/445 (2006.01)
G06F 9/45 (2006.01)

(52) U.S. Cl.
CPC .............. *G06F 9/44521* (2013.01); *G06F 8/52* (2013.01)

(58) Field of Classification Search
None
See application file for complete search history.

(56) References Cited

U.S. PATENT DOCUMENTS

| | | | |
|---|---|---|---|
| 6,349,344 B1 * | 2/2002 | Sauntry et al. | 719/332 |
| 6,530,080 B2 * | 3/2003 | Fresko et al. | 717/166 |
| 6,865,730 B1 * | 3/2005 | Burke et al. | 717/116 |
| 6,901,591 B1 * | 5/2005 | Sokolov | 718/1 |
| 6,915,511 B2 * | 7/2005 | Susarla et al. | 717/166 |
| 7,162,611 B2 * | 1/2007 | Rose et al. | 712/209 |
| 7,493,616 B2 * | 2/2009 | Yach et al. | 718/100 |
| 7,568,202 B1 * | 7/2009 | Papineau et al. | 719/320 |
| 7,634,768 B2 * | 12/2009 | Chen et al. | 717/162 |
| 7,694,289 B2 * | 4/2010 | Stattenfield | 717/149 |
| 2003/0009743 A1 * | 1/2003 | Fresko et al. | 717/117 |
| 2004/0215444 A1 * | 10/2004 | Patel et al. | 704/2 |
| 2005/0108690 A1 * | 5/2005 | Lau et al. | 717/136 |
| 2005/0108692 A1 * | 5/2005 | Lau et al. | 717/136 |
| 2005/0246677 A1 * | 11/2005 | Mountain et al. | 717/100 |
| 2006/0047974 A1 * | 3/2006 | Alpern et al. | 713/191 |
| 2006/0136885 A1 * | 6/2006 | Stattenfield | 717/140 |

* cited by examiner

Primary Examiner — Isaac T Tecklu

(57) ABSTRACT

A method for runtime environment emulation involves loading an application class of an object-oriented application, where the object-oriented application is executing in a runtime environment, and where the application class includes a method call that is unsupported by the runtime environment. The method further involves translating, during loading of the application class, the unsupported method call into one or more method calls that are supported by the runtime environment, to obtain a translated class, where the one or more supported method calls emulate the unsupported method call.

20 Claims, 4 Drawing Sheets

METHOD AND SYSTEM FOR RUNTIME ENVIRONMENT EMULATION

BACKGROUND

In computer systems, a runtime environment is a collection of executable instructions that provides an operative foundation for execution of other applications. Specifically, a runtime environment typically includes one or more libraries of commands that other applications may utilize to accomplish computing tasks. Interfaces to such libraries are commonly referred to as application programming interfaces (APIs). For example, a given API may provide access to commands for user input, audio/visual output, networking, file management, commonly used algorithms and data structures, etc. More specifically, in object-oriented programming, the commands may be methods contained in classes. The concepts of methods and classes, as applied to object-oriented programming, are well known in the art.

The specific implementation of a runtime environment typically depends on the underlying computer system. Specifically, the implementation may depend on the underlying hardware architecture (e.g., instruction set, user interface, etc.), software operating system, any other similar factor, or any combination thereof For example, the implementation of a runtime environment for a Microsoft® Windows operating system would differ from the implementation of a runtime environment for a Linux operating system. Microsoft® is a registered trademark of Microsoft Corporation.

Though a runtime environment may be implemented differently for different types of computer systems, the different implementations may have some or all of an API in common. Further, the implementations may be designed so that a single application may be able to execute in multiple implementations of the runtime environment. Specifically, the application may be compiled into an intermediate language that is understood by multiple implementations of the runtime environment. Such runtime environments are commonly referred to as virtual machines, because the runtime environments provide a layer of virtualization between applications and the underlying computer systems.

In some cases, one or more of the commands available in a particular implementation of a runtime environment may not be supported by another implementation of the runtime environment. For example, a mobile phone implementation of a runtime environment may include a command (e.g., a command for using a hardware feature of the mobile phone) that is unsupported by a desktop computer implementation of the runtime environment. If an application uses a command that is unsupported by a particular implementation of a runtime environment, then the application may not be able to execute correctly using that implementation of the runtime environment. Specifically, if a reference to the unsupported command (e.g., an unsupported method call) is encountered during execution of the application, an error may occur.

SUMMARY

In general, in one aspect, the invention relates to a method for runtime environment emulation. The method comprises loading an application class of an object-oriented application, wherein the object-oriented application is executing in a runtime environment, and wherein the application class comprises a method call that is unsupported by the runtime environment, and translating, during loading of the application class, the unsupported method call into at least one method call that is supported by the runtime environment, to obtain a translated class, wherein the at least one supported method call emulates the unsupported method call.

In general, in one aspect, the invention relates to a system. The system comprises a runtime environment and an object-oriented application configured to execute in the runtime environment, wherein an application class of the object-oriented application comprises a method call that is unsupported by the runtime environment. The system further comprises a class loader configured to translate, during loading of the application class in the runtime environment, the unsupported method call into at least one method call that is supported by the runtime environment, to obtain a translated class, wherein the at least one supported method call emulates the unsupported method call.

In general, in one aspect, the invention relates to a computer readable medium. The computer readable medium comprises executable instructions for runtime environment emulation by loading an application class of an object-oriented application, wherein the object-oriented application is executing in a runtime environment, and wherein the application class comprises a method call that is unsupported by the runtime environment, and translating, during loading of the application class, the unsupported method call into at least one method call that is supported by the runtime environment, to obtain a translated class, wherein the at least one supported method call emulates the unsupported method call.

Other aspects of the invention will be apparent from the following description and the appended claims.

DETAILED DESCRIPTION

Figure 1:
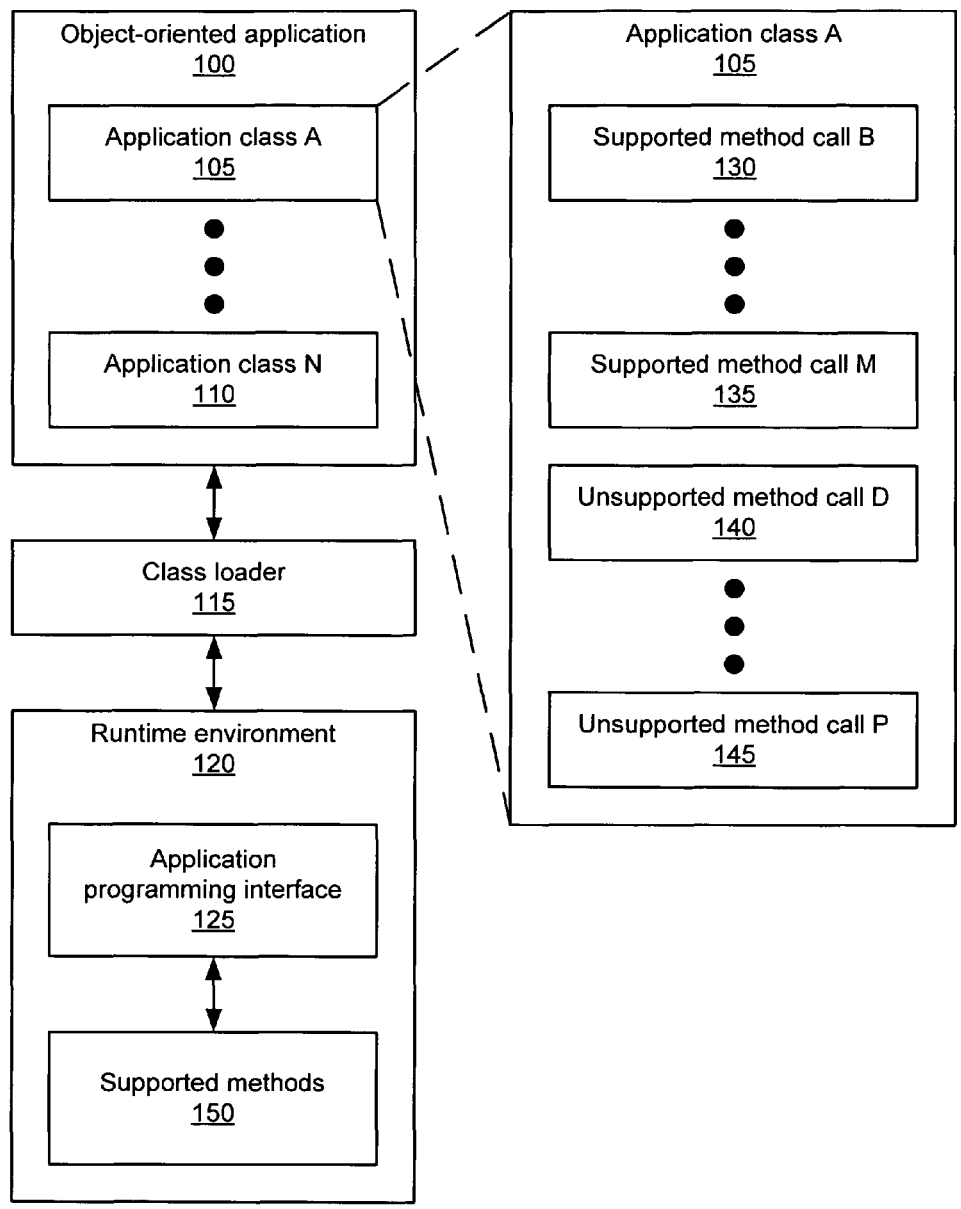
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for runtime environment emulation. During loading of a class of an object-oriented application executing in a runtime environment, a method call that is unsupported by the runtime environment is translated into one or more method calls that are supported by the runtime environment. Specifically, the supported method call(s) emulate the unsupported method call. The supported method call(s) may then be executed in place of the unsupported method call.

FIG. 1 shows a diagram of a system in accordance with one or more embodiments of the invention. Specifically, FIG. 1 shows a diagram of a runtime environment (120) configured to execute an object-oriented application (100). More specifically, the runtime environment (120) may include an application programming interface (125) providing access to supported methods (150), i.e., methods that are supported by the runtime environment (120).

In one or more embodiments of the invention, the runtime environment (120) may be a Java™ runtime environment, a Microsoft® .NET runtime environment, or any other similar type of runtime environment. Accordingly, the object-oriented application (100) may be a Java™ application, a Microsoft® ASP.NET application, a Microsoft® C# application, or any other similar type of application. Java™ is a trademark of Sun Microsystems, Inc. Further, the application programming interface (125) may be a Java™ API, a Microsoft® Foundation Class Library (FCL), or any other similar type of API. More specifically, while examples provided below make specific reference to the use of Java™ class files, any other similar type of class file may be used. For example, Microsoft® C# modules may be used with support from the Microsoft® .NET System.Reflection.Assembly class or any similar .NET programming construct. Accordingly, references herein to the use of Java™ class files should be understood to be exemplary only and in no way limiting the scope of the invention.

In one or more embodiments of the invention, the object-oriented application (100) may include one or more application classes (e.g., application class A (105), application class N (110)). Further, as exemplified in the expanded diagram of application class A (105), an application class (e.g., 105, 110) may include one or more supported method calls (e.g., supported method call B (130), supported method call M (135)), i.e., calls to one or more of the supported methods (150). Moreover, an application class (e.g., 105, 110) may include one or more unsupported method calls (e.g., unsupported method call D (140), unsupported method call P (145)), i.e., calls to methods that are not supported by the runtime environment (120).

For example, the unsupported method call(s) (e.g., 140, 145) may be specific to a different implementation (not shown) of the runtime environment (120). More specifically, one or more of the unsupported method call(s) (e.g., 140, 145) may rely on a native function call, i.e., a call to a function that is native to a specific type of underlying computer system. Said another way, the unsupported method call(s) (e.g., 140, 145) may be directed to a type of computer system (e.g., a mobile phone, a personal digital assistant (PDA), an embedded device, etc.) that is not supported by the runtime environment (120).

In one or more embodiments of the invention, for the object-oriented application (100) to execute in the runtime environment (120), one or more of the application classes (e.g., 105, 110) may be loaded by a class loader (115). Specifically, the class loader (115) may be configured to prepare the application class (e.g., 105, 110) for execution in the runtime environment (120) once a reference to the application class (e.g., 105, 110) is encountered. For example, the reference may be a call to a method contained in the application class (e.g., 105, 110), an import statement, or any other similar type of reference. Those skilled in the art will appreciate that the specific terminology used for the concept of class loaders varies between runtime environments. For example, in Microsoft® .NET, class loaders are commonly referred to as assembly builders. Accordingly, the particular terminology used herein in reference to class loaders should not be construed as limiting the scope of the invention.

In one or more embodiments of the invention, the class loader (115) may be further configured to identify unsupported method calls (e.g., 140, 145) in an application class (e.g., 105, 110) that is being loaded, and translate the unsupported method call(s) (e.g., 140, 145) into one or more calls to the supported methods (150), to obtain a translated class (not shown). Further, the class loader (115) may be configured to place the translated class in a non-reserved namespace. Moreover, the class loader (115) may be configured to replace a reference to the application class (e.g., 105, 110) with a reference to the translated class. Each of these functions is discussed below.

Figure 2:
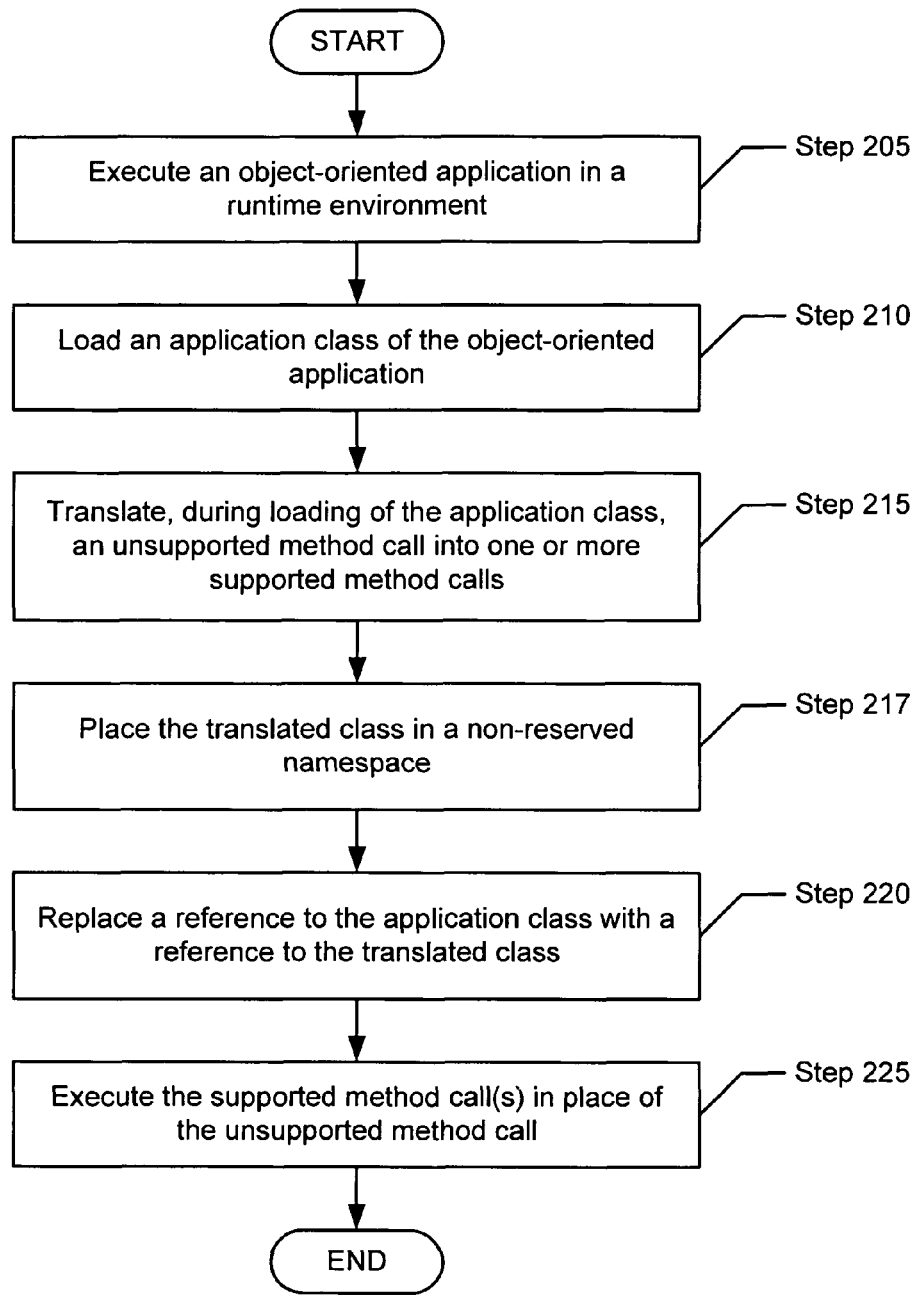
FIG. 2 shows a flowchart in accordance with one or more embodiments of the invention.

FIG. 2 shows a flowchart in accordance with one or more embodiments of the invention. Specifically, FIG. 2 shows a flowchart of a method for runtime environment emulation in accordance with one or more embodiments of the invention. In one or more embodiments of the invention, one or more of the steps discussed below may be omitted, performed in a different order, and/or repeated. Accordingly, the specific arrangement of steps shown in FIG. 2 should not be construed as limiting the scope of the invention.

In one or more embodiments of the invention, in Step 205, an object-oriented application may be executed in a runtime environment. For example, a Java™ application may be executed in a Java™ runtime environment, a Microsoft® C# application may be executed in a Microsoft® .NET runtime environment, etc. Further, in one or more embodiments of the invention, one or more application classes of the object-oriented application may include one or more unsupported method calls. For example, the object-oriented application may be a Java™ Micro Edition (ME) application including one or calls to methods that rely on native function call(s), while the runtime environment may be a Java™ Standard Edition (SE) runtime environment that does not support the same method(s). More specifically, the object-oriented application may include method calls directed to a Java™ Mobile Information Device Profile (MIDP), a Java™ Foundation Profile, a Java™ Personal Profile, a Java™ Personal Basis Profile, or any other similar Java™ profile. Java™ profiles are known in the art as specific implementation categories of the Java™ runtime environment.

Continuing with discussion of FIG. 2, in one or more embodiments of the invention, in Step 210, an application class of the object-oriented application may be loaded. Specifically, the application class may be loaded once a reference to the application class is encountered. In one or more embodiments of the invention, the application class may be loaded by a class loader (e.g., the class loader (115) of FIG. 1). Further, as discussed above, the application class may include one or more unsupported method calls.

In one or more embodiments of the invention, in Step 215, an unsupported method call in the application class may be translated into one or more supported method calls. Specifically, during loading of the application class, the unsupported method call may be identified and translated into the appropriate supported method call(s). In one or more embodiments of the invention, translating the unsupported method call into supported method call(s) may involve referencing a predetermined method call mapping to select the appropriate supported method call(s). For example, the predetermined method call mapping (e.g., database table, comma separated values (CSV) file, extensible markup language (XML) file, etc.) may provide mappings of methods that rely on native function calls to standard Java™ method calls.

Alternatively, translation of unsupported method calls into supported method calls may be based on the names of the unsupported methods. That is, for each method that relies on a native function call, a corresponding method may be implemented in standard Java™ with the same method name. Accordingly, translating an unsupported method call into a supported method call may simply involve substituting the standard Java™ method for the method that relies on a native function call. If the standard Java™ method has exactly the same name as the method that is replaced, then an explicit method call mapping may not be required. That is, the method name itself may be sufficient to determine the corresponding replacement method.

Further, in one or more embodiments of the invention, translating the unsupported method call into supported method call(s) may involve replacing a compiled code segment with another compiled code segment. For example, in a Java™-based embodiment, the application class may be compiled into bytecode. Accordingly, to translate the unsupported method call into supported method call(s), a class loader may parse the bytecode to identify a bytecode segment associated with an unsupported method call. The unsupported bytecode segment may then be replaced with a supported bytecode segment corresponding to the supported method call(s) (e.g., by referencing a predetermined method call mapping, as discussed above). Thus, the class that is ultimately loaded may effectively be a translated class, i.e., a class that is based on the application class but containing one or more translated bytecode segments. Similar methods may be used with other runtime environments, such as Microsoft® .NET.

In one or more embodiments of the invention, if a compiled code segment is replaced with another compiled code segment, the replacement code segment may be pre-compiled. Specifically, the replacement code segment may be compiled prior to executing the object-oriented application. More specifically, if a predetermined method call mapping is used to associated unsupported method calls with supported method calls, code corresponding to each mapping may be precompiled for use by a class loader. Alternatively, the replacement code segment may be compiled at runtime, as needed. Pre-compiling replacement code segments may improve performance of the class loader by reducing the amount of processing required during the translation process.

As discussed above, the class that is ultimately loaded may effectively be a translated class. Further, in one or more embodiments of the invention, the application class may belong to a reserved namespace. The concept of namespaces as applied to object-oriented programming is well known in the art. Specifically, the namespace to which the application class belongs may be reserved by the runtime environment. For example, in a Java™-based embodiment, the application class may belong to a java.* namespace or any other similar namespace. Those skilled in the art will appreciate that java.* namespaces are reserved by the Java™ runtime environment. Said another way, classes that are not part of the Java™ runtime environment are not allowed to belong to a java.* namespace. Accordingly, in one or more embodiments of the invention, in Step 217, the translated class may be placed in a non-reserved namespace.

Further, in one or more embodiments of the invention, in Step 220, a reference to the application class may be replaced with a reference to the translated class. Specifically, if the translated class is placed in a different namespace than the application class (e.g., a non-reserved namespace rather than a reserved namespace), the reference may be replaced so that the translated class is used when the reference is encountered. Further, if another class is loaded, the class may be examined during loading to identify any references to the application class, and those references may be replaced with references to the translated class.

In one or more embodiments of the invention, in Step 225, the supported method call(s) may be executed in place of the unsupported method call. Specifically, the translated class may be used in place of the application class. In one or more embodiments of the invention, using the translated class in place of the application class may avoid the types of errors associated with attempting to execute an unsupported method call.

Figure 3:
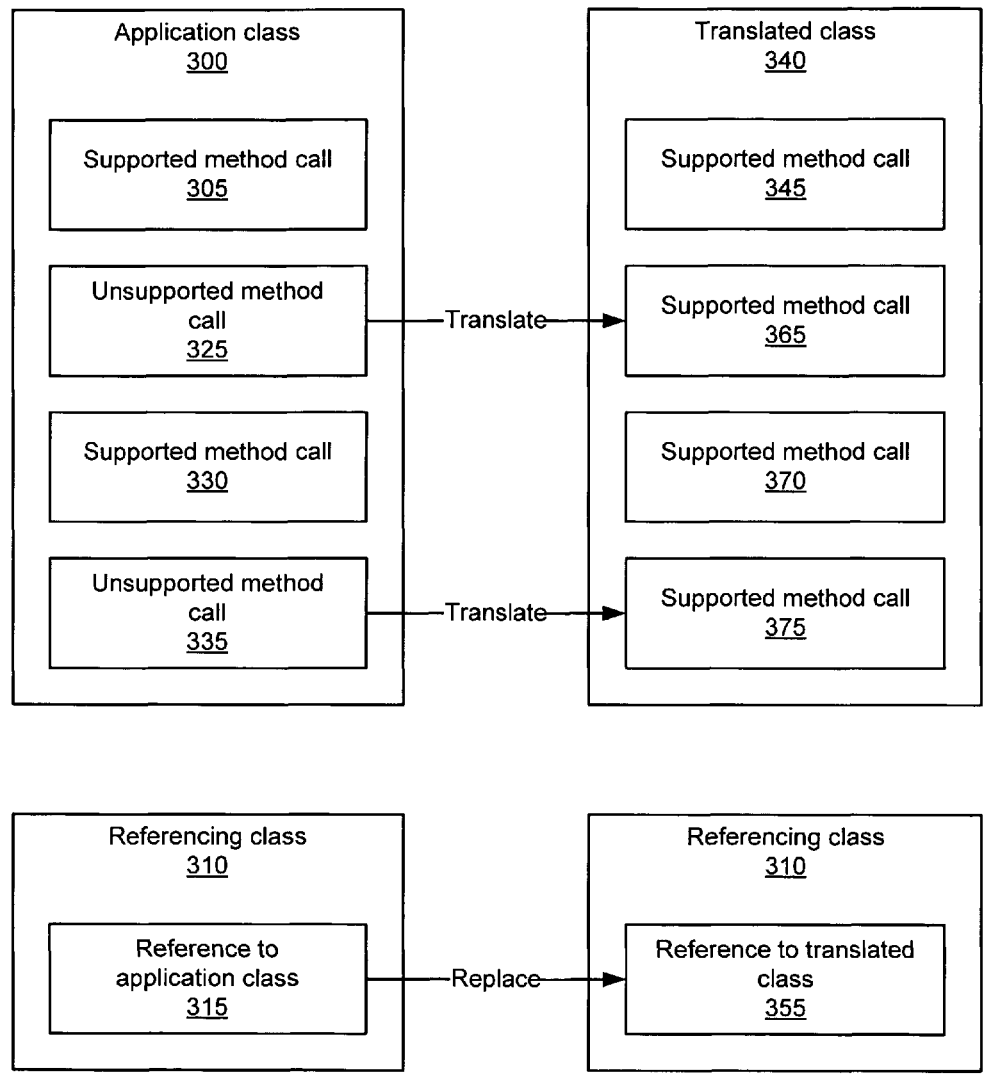
FIG. 3 shows a diagram of an example in accordance with one or more embodiments of the invention.

FIG. 3 shows a diagram of an example in accordance with one or more embodiments of the invention. Specifically, FIG. 3 shows a diagram of an application class (300) that includes two supported method calls (i.e., 305, 330) and two unsupported method calls (i.e., 325, 335). Those skilled in the art will appreciate that the application class (300) is provided for exemplary purposes only. In one or more embodiments of the invention, any number of supported method calls (e.g., 305, 330) and/or unsupported method calls (e.g., 325, 335) may be used. Further, FIG. 3 shows a diagram of a referencing class (310) that includes a reference to the application class (315).

When the application class (300) is loaded for execution in a runtime environment, a class loader identifies the unsupported method calls (i.e., 325, 335) and translates the unsupported method calls into supported method calls (i.e., 365 and 375, respectively). Specifically, a translated class (340) is generated that includes only supported method calls (i.e., 345, 365, 370, 375). Further, if the translated class (340) is placed in a different namespace than the application class (300) (e.g., a non-reserved namespace, as discussed above), the reference to the application class (315) in the referencing class (310) is replaced with a reference to the translated class (355). Thus, the translated class (340) is used in place of the application class (300).

In one or more embodiments of the invention, a runtime environment may include one or more classes and/or methods that are directed to device emulation. Specifically, the classes and/or methods may include functionality for generating a functioning visual representation of a device (e.g., a mobile phone, personal digital assistant (PDA), embedded device, etc.). Accordingly, translating unsupported method calls into supported method calls may allow device emulation classes and/or methods to be used without rewriting the application that contains the unsupported method calls.

Further, one or more embodiments of the invention may facilitate the development of applications for specific types of computer systems. Specifically, developers may be able to use one implementation of a runtime environment to develop applications for another implementation of the runtime environment. Moreover, in one or more embodiments of the invention, a class loader capable of runtime environment emulation may be provided to end-users, so that the end-users may execute the application in a runtime environment for which the application was not specifically developed.

Figure 4:
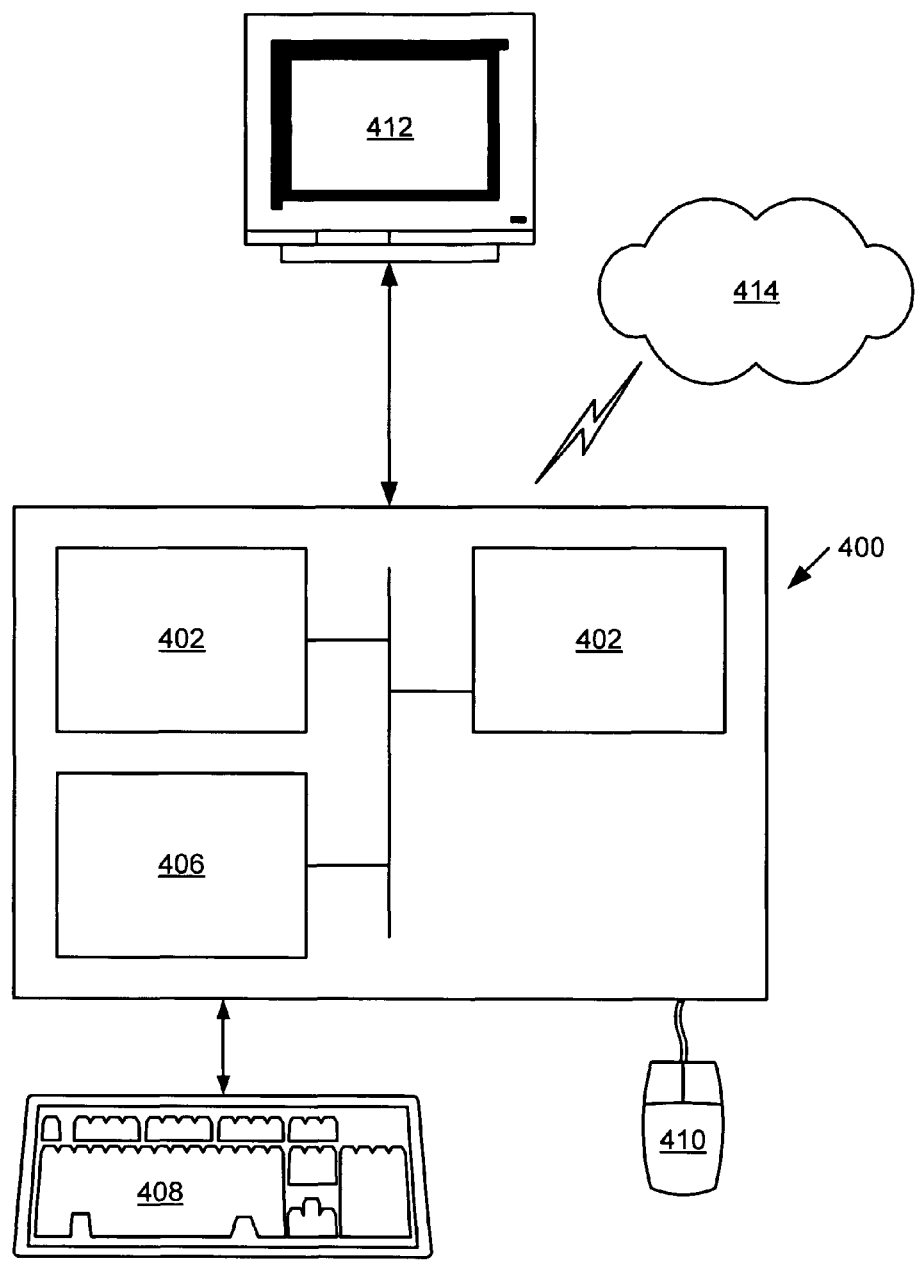
FIG. 4 shows a diagram of a computer system in accordance with one embodiment of the invention.

Embodiments of the invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a network (414) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., object-oriented application, class loader, runtime environment, application programming interface, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for runtime environment emulation comprising:
    loading an application class of an object-oriented application,
        wherein the object-oriented application is executing in a runtime environment on a computer system prior to the loading, and
        wherein the application class comprises a method call that is unsupported by the runtime environment; and
    translating on the computer system, during loading of the application class, the unsupported method call into at least one method call that is supported by the runtime environment, to obtain a translated class,
    wherein the at least one supported method call emulates the unsupported method call.

2. The method of claim 1, further comprising:
    executing the at least one supported method call in place of the unsupported method call.

3. The method of claim 1, further comprising:
    placing the translated class in a non-reserved namespace, wherein the application class is in a reserved namespace; and
    replacing a reference to the application class with a reference to the translated class.

4. The method of claim 3, wherein the reserved namespace is a Java™ reserved namespace.

5. The method of claim 1, wherein translating the unsupported method call into the at least one supported method call comprises replacing a first compiled code segment with a second compiled code segment.

6. The method of claim 5, wherein the second compiled code segment is compiled prior to executing the object-oriented application.

7. The method of claim 1, wherein translating the unsupported method call into the at least one supported method call is based on a predetermined method call mapping.

8. The method of claim 1, wherein the unsupported method call comprises a native function call.

9. The method of claim 1, wherein the runtime environment is a Java™ runtime environment and the application class is a Java™ classfile.

10. The method of claim 1, wherein the runtime environment is a Java™ Standard Edition (SE) runtime environment and the object-oriented application is a Java™ Micro Edition (ME) application.

11. A system comprising:
    a processor;
    a runtime environment executing on the processor;
    an object-oriented application, when executed on the processor, configured to execute in the runtime environment,
        wherein an application class of the object-oriented application comprises a method call that is unsupported by the runtime environment; and
    a class loader, when executed on the processor, configured to:
        translate, during loading of the application class in the runtime environment while the object-oriented application is executing, the unsupported method call into at least one method call that is supported by the runtime environment, to obtain a translated class,
        wherein the at least one supported method call emulates the unsupported method call.

12. The system of claim 11, wherein the class loader is further configured to:
    place the translated class in a non-reserved namespace, wherein the application class is in a reserved namespace; and
    replace a reference to the application class with a reference to the translated class.

13. The system of claim 12, wherein the reserved namespace is a Java™ reserved namespace.

14. The system of claim 11, wherein translating the unsupported method call into the at least one supported method call comprises replacing a first compiled code segment with a second compiled code segment.

15. The system of claim 14, wherein the second compiled code segment is compiled prior to executing the object-oriented application.

16. The system of claim 11, wherein translating the unsupported method call into the at least one supported method call is based on a predetermined method call mapping.

17. The system of claim 11, wherein the unsupported method call comprises a native function call.

18. The system of claim 11, wherein the runtime environment is a Java™ runtime environment and the application class is a Java™ classfile.

19. The system of claim 18, wherein the runtime environment is a Java™ Standard Edition (SE) runtime environment and the object-oriented application is a Java™ Micro Edition (ME) application.

20. A non-transitory computer readable medium comprising executable instructions for runtime environment emulation by:
    loading an application class of an object-oriented application,
        wherein the object-oriented application is executing in a runtime environment on a computer system prior to the loading, and
        wherein the application class comprises a method call that is unsupported by the runtime environment; and
    translating on the computer system, during loading of the application class, the unsupported method call into at least one method call that is supported by the runtime environment, to obtain a translated class,
    wherein the at least one supported method call emulates the unsupported method call.

* * * * *